United States Patent [19]

Bes et al.

[11] Patent Number: 4,985,187

[45] Date of Patent: Jan. 15, 1991

[54] METHOD FOR COLORING PLASTIC GRANULES BY MIXING WITH COLORING AGENT AT AMBIENT TEMPERATURE

[75] Inventors: Richard F. T. Bes; Jan D. Knol, both of Apeldoorn, Netherlands

[73] Assignee: Holland Colours Apeldoorn BV, Netherlands

[21] Appl. No.: 189,763

[22] Filed: May 3, 1988

[30] Foreign Application Priority Data

May 4, 1987 [NL] Netherlands ......................... 8701051

[51] Int. Cl.$^5$ ................................................ B29B 7/00
[52] U.S. Cl. ..................................... 264/13; 23/313 R; 264/5; 264/117; 523/351
[58] Field of Search ................... 264/117, 13; 523/351; 23/313 R

[56] References Cited

U.S. PATENT DOCUMENTS

| | | |
|---|---|---|
| 3,591,409 | 7/1971 | Aubrey et al. |
| 4,484,952 | 11/1984 | Bes et al. .......................... 106/308 Q |
| 4,495,128 | 1/1985 | Stoffelsma .......................... 264/211 |
| 4,510,271 | 4/1985 | Muhle et al. ........................ 523/346 |

FOREIGN PATENT DOCUMENTS

| | | |
|---|---|---|
| 0235831 | 9/1987 | European Pat. Off. . |
| 2089979 | 1/1972 | France . |
| 6508802 | 7/1965 | Netherlands . |
| 7904675 | 6/1979 | Netherlands . |
| 8000464 | 1/1980 | Netherlands . |
| 8003469 | 6/1980 | Netherlands . |
| 8100329 | 1/1981 | Netherlands . |
| 1369638 | 10/1974 | United Kingdom . |
| 1392261 | 4/1975 | United Kingdom . |
| 2070048A | 9/1981 | United Kingdom . |

*Primary Examiner*—Jan H. Silbaugh
*Assistant Examiner*—Catherine Timm
*Attorney, Agent, or Firm*—Ostrolenk, Faber, Gerb & Soffen

[57] ABSTRACT

Colored plastic granules are obtained by mixing plastic granules with particles of a coloring agent composition until the colouring agent composition particles are attached to the surface of the plastic granules. The coloring agent composition particles used are substantially spherical; in the particles the coloring agent, such as a pigment, is completely wetted with the carrier present in the composition. The method includes a mixing step in which granules to be coated are mixed, substantially at ambient temperature, with colouring agent composition particles. During mixing the temperature is controlled to remain below the melting temperature of the carrier use.

12 Claims, No Drawings

METHOD FOR COLORING PLASTIC GRANULES BY MIXING WITH COLORING AGENT AT AMBIENT TEMPERATURE

BACKGROUND OF THE INVENTION

The invention relates to coloured plastic granules obtained by mixing plastic granulate particles with colouring agent particles.

In the present application, a colouring agent is in general understood to mean a pigment; for particular applications, however, the term may relate to a soluble colouring agent.

Coloured plastic granules and also methods for the preparation of such granules are known from the Dutch Pat. application No. 6,508,802 in which a method is described for mixing a plastic, such as for example polyvinyl chloride, with a 1 colour pigment at temperatures up to 150° C. and subjecting said mixture to frictional forces and/or shear stresses, as a result of which the pigment particles are rubbed into the capillaries of the plastic particles.

This known method has the disadvantage that it is possible to process only pigments which are of particle size less than the capillaries of the plastic particles or that there has to be an appreciable hardness difference between the colouring agent particles and the plastic particles, the plastic particles having to have pores of which at least the edges are harder than the pigments which have to be absorbed by the plastic particles. A colouring agent which is much harder than the edges of the pores would in general only be capable of being processed if the size of the colouring agent particles is significantly less than the diameter of the pores. This implies that there is a significant limitation in the choice of colouring agents and plastics and that only certain combinations can be successfully processed.

SUMMARY OF THE INVENTION

The present invention has the object of providing coloured plastic granules which do not have the above-mentioned disadvantage and which are characterized in that the colouring agent particles are colouring agent composition particles and are obtained by mixing colouring agent particles with a molten carrier, which is solid at ambient temperature, followed by dispersion of the mixture to form substantially spherical particles prior to a solidification of the mixture; said colouring agent composition particles being such that therein the pigment particles are completely wetted by the carrier material and the colouring agent composition particles being attached to the surface of plastic granulate particles.

The invention also relates to a method for colouring plastic granules by mixing plastic granulate particles with colouring agent particles, said method being characterized in that, by means of a mixing apparatus, plastic granulate particles are mixed, substantially at ambient temperature, with colouring agent particles which are colouring agent composition particles and are obtained by mixing colouring agent particles and a molten carrier, which is solid at ambient temperature, followed by dispersion of the mixture to form substantially spherical particles prior to a solidification of the mixture.

By application of said method, plastic granules are obtained, the particles of which have a homogeneously coloured surface and which can be extremely well processed in moulding plastic products by means of known techniques such as injection moulding or extrusion. In the method according to the invention, the colouring agent composition is, as it were, firmly bonded to the outside of the plastic granulate particles; since the surface of the granules is always somewhat rough, a small quantity of the colouring agent composition is always rubbed off during contact on to the surface of said plastic granulate particles as a result of the continuous contact during the mixing operation between the rough plastic granulate particles and the thermoplastic colouring agent composition particles. This process of rubbing off of colouring agent composition on to the surface of the plastic granulate particles continues until a certain saturation is reached; above this limit, the layer thickness of colouring agent composition on the plastic granulate particles will not increase further. The point at which the layer thickness of the colouring agent composition does not increase further is termed the saturation point.

Expediently, therefore, mixing is continued until the surface of the plastic granulate particles is saturated with the colouring agent composition. During said mixing, care is taken to maintain the temperature of the total mixture lower than the melting point of the carrier used in the colouring agent composition.

It is observed that the colouring composition referred to above, which is constituted by an intimate mixture, in the form of particles, of a meltable organic carrier having a melting point below 150° C. and a pigment is known per se from No. GB-A-2070048. Not described there is a mixing treatment to provide for adherence of such particles to the surface of plastic granules to obtain coloured granules.

Advantageously, the amount of colouring agent composition referred to the amount by weight of the plastic granules to be coloured is 0 to 5.0% and preferably 0.5 to 2.0%. The amount of colouring agent composition relative to the amount of plastic granules is not very critical; this also finds expression in the limits of addition. It is precisely the fact that above a certain value no further colouring agent composition is absorbed by the plastic granulate particles which results in it not being necessary to keep undue control over the amount of colouring agent composition with respect to the quantity of granules.

Advantageously, the ratio of the largest dimensions of the plastic granulate particles and the colouring agent composition particles is between 3:1 and 20:1 and preferably 10:1. The best result is obtained with colouring agent composition particles which are smaller than the plastic granulate particles: if the colouring agent composition particles are larger than the plastic granulate particles, a less homogeneous covering of the plastic granulate particles with colouring agent composition will be obtained.

The plastic granulate particles obtained may be used immediately for processing in an extruder or the like; obviously, the coloured plastic granules may also be stored and processed at another instant or another site.

The invention also relates to a method for producing a coloured plastic object by processing coloured plastic granules in a manner such that the colouring agent is homogeneously dispersed through the bulk in the finished plastic object, which method is characterized in that use is made of coloured plastic granules which are obtained by means of the method of the invention. Suitable processing techniques are injection moulding and extrusion; during this processing, the plastic attains the plastic or liquid state and a homogeneous dispersion of the colouring agent through the bulk of the moulded object is achieved.

It is pointed out that the colouring agent particles which are used for colouring plastic granulates and which consist of a homogeneous mixture of pure colouring agent particles and a carrier which is solid at ambient temperature are also known from Dutch Patent Application Nos. 7,904,675, 8,100,329, 8,000,464, 8,003,468, 8,003,469 and 8,100,329.

In said applications, the preparation is described as a colouring agent composition prepared by mixing colouring agent and molten carrier material, followed by dispersion into particles before or after solidification of the mixture.

If said colouring agent particles are fed together with plastic granulate particles into the feed hopper, of an extruder, a demixing tendency is observed, especially in the case where the coated plastic particles have a free-flowing nature, the particles of the complete mixture having the greatest specific gravity and/or the smallest size exhibiting a greater velocity of travel towards the extruder inlet than the particles of the lowest specific gravity and/or the largest size. Such a demixing tendency will adversely effect the colour homogeneity of the objects to be moulded.

The method according to the present invention is suitable for all types of granular synthetic material, such as PVC, ABS, PP etc. The method is equally suitable for use with such synthetic resins which show some degree of incompatibility for the carrier material used. Therefore very good results are obtained when colouring for instance ABS, polypropylene etc. which show such property.

A solution for the demixing problem described above is offered by carrying out a precoating of the plastic granulate particles with colouring agent/carrier material according to the method of the invention.

If reference is made in this description to a carrier, then this is understood to mean both a pure carrier material and also a carrier material which is mixed with amounts of additive which serve to improve the properties of the carrier material.

A usable fusable carrier is, for example, glycerol monostearate (melting point 74°-81° C.). Other expediently usable fusable carriers are stearamide (melting point 99° C.), ethylene bis(stearamide) (melting point 143° C.), hydrogenated castor oil (melting point 84° C.) and esters of pentaerythritol, in particular the mono- and tetraesters of stearic acid (melting point 50°-53° C. and 64° C. respectively).

To regulate the melting behaviour and the viscosity, the composition may expediently contain metal salts, preferably in an amount of 0 to 5%. Metal salts preferably used are calcium, zinc and lead stearate.

For this purpose, hydrocarbons, such as waxes and/or low-molecular polymeric compounds, may also be present in the said amounts.

For this object, the composition may also contain liquid esters of dicarboxylic acids, preferably aromatic dicarboxylic acids, said esters being used preferably in amounts of 0 to 15%. Suitable esters are the esters of phthalic acid and alcohols containing 4 to 8 carbon atoms; esters of alcohols containing 4 carbon atoms are liquid, while those of alcohols containing 12 carbon atoms are solid.

As a result of using a fusable carrier with relatively low melting or softening point, the colouring agents can easily be dispersed, which presents many possibilities for dispersing and dispensing colouring agents in thermoplastic compounds, thermosetting plastic compounds, cosmetic products, rubbers, insecticides, pharmaceutical products, paints, foodstuffs, printing inks and the like.

With particular advantage, the colouring agent composition contains a surface-active substance, such as an anionogenic, cationogenic or nonionogenic substance which effects the pigmenting level, stability and rheological properties of the colouring agent composition favourably and positively. Pigmenting level is in this case understood to mean the amount of pigment or colouring agent in the composition.

With particular advantage, the pigmenting level is between 15 and 95%, preferably between 20 and 85%. Above a percentage of 85%, the fusable carrier often loses its flow properties, as a result of which the advantages according to the invention are no longer obtained, while, with pigmenting levels less than 15%, the suspension readily settles and is no longer stable. Adding surface active substances may, in particular, increase the pigmenting level to 95%.

The surface active substance used is preferably an anionogenic surface-active substance for certain organic pigments and a nonionogenic surface-active substance for inorganic and most of the organic pigments.

The melting point of the fusable carrier is expediently between 40° and 145° C. and preferably between 50° and 100° C.

The composite colouring agent may advantageously consist of finely dispersed products, such as flakes, granules, small granules and the like.

In order to obtain such particles, the molten carrier with dispersed colouring agent therein may be pressed through a perforated tray, after which the drops fall on to a water-cooled stainless-steel cooling strip and solidify in this manner.

Fine-grained pigment concentrates can also be obtained by spraying the melt into air at room temperature, particles being obtained with the size of 0.2 to 2 mm.

Plastic granulate particles which have been coated by making use of the method according to the invention with a colouring agent-carrier mixture, have virtually no tendency to coagulate. If coagulation has nevertheless occurred as a result of extremely high ambient temperature during storage, it will be possible to eliminate the coagulation by applying a simple treatment such as shaking or tapping.

All this is probably associated with the fact that the plastic granulate particles according to the invention are covered only with a very thin skin of colouring agent-carrier composition.

The invention also relates to an apparatus for colouring plastic granules to be used for applying the method according to the invention. For this purpose, said apparatus is characterized in that it is formed by a mixer provided with plastic granules and colouring agent composition feeding means and means for detecting the degree of saturation of the plastic granulate particles with colouring agent composition and also means for controlling mixer and material feed.

The means for detecting the degree of saturation of the plastic granulate particles with the colouring agent composition may, for example, be formed by an optical apparatus with which the depth of colour of the coloured plastic granulate is measured. If there is saturation, the reading of said apparatus will no longer be seen to change with time and the point of saturation has then been reached.

The measurement of the degree of saturation is not limited to the use of said apparatus, other methods of measurement also being possible; consideration can be given to continuous measurement of particle size distribution or continuous measurement of the mean specific gravity. The apparatus described for this purpose is, in particular, of use in the case of discontinuous operation; if continuous operation is required, this is also very readily possible. However, in addition to the feed of composite colouring agent and granules to be coloured, provision has also to be made for removal of coloured granules and measurement of the degree of saturation of the plastic granulate particles with colouring agent composition. An apparatus suitable for this purpose is characterized in that removal means are likewise provided for the coloured granules, the control means regulating granule and colouring agent composition feed, removal of coloured granules and mixing, in accordance with the difference between the signal from the means for detecting the degree of saturation of the plastic granulate particles with colouring agent composition and a reference value of said signal.

In that manner coloured plastic granules are obtained which excel in an extremely homogeneous nature.

The invention will now be explained with reference to a number of exemplary embodiments.

EXAMPLE I 2.5 kg of molten pentaerythritol monostearate is mixed with 7.5 kg of cadmium sulphide yellow. After mixing, the melt is sprayed in air at room temperature to form substantially spherical particles having an average diameter of 200 um.

100 kg of ABS granules having a cylindrical section, the diameter being 2.5 mm and the cut length along the axis of the cylinder likewise being 2.5 mm, are introduced into a turbo-mixer by a barrel with a diameter of 75 cm provided with a mixing propeller having a diameter of 50 cm. The ABS is mixed with 1 kg of a colouring agent composition which contains 0.25 kg of pentaerythritol monostearate and 0.75 kg of cadmium sulphide yellow and which has been produced in the method specified above. The mean size of the colouring agent composition particles was 0.2 mm. During mixing the temperature was controlled to remain below the melting point of the carrier material used; i.e. well below 50° C. in this case. The mixing disc was allowed to rotate at 110 revolutions/minute for 2 minutes. Measurement with a reflection colour densitometer specifically produced for this purpose then revealed no further change in the colour depth in the yellow region. The mixing was terminated and free-flowing, completely homogeneous yellow-coloured ABS granules had been obtained which could be excellently processed to form homogeneous coloured yellow objects by means of the usual processing methods.

When checked no remaining, free colouring agent composition particles were found in the barrel. All particles were taken up on the surface of the granules.

EXAMPLE II 100 kg of polypropylene granules with a melt index of 6–12 and a mean particle size of 3×3 mm were introduced into the mixing apparatus from Example I. 1½ kg of a colouring agent composition which contained 0.2 kg of soot and 0.8 kg of hydrogenated castor oil (melting point 84° C.) per kg were added; the colouring agent composition particles had a mean particle size of 300 um. During mixing, the temperature of the total mixture was controlled to remain well below 84° C. After mixing for 2.5 minutes, the colour depth of the granules did not increase any further and the mixing was terminated. Free-flowing, uncoagulated grey polypropylene granules were obtained which could be processed without difficulty to form polypropylene objects using usual moulding methods.

The objects obtained were homogeneous in colour.

What is claimed is:

1. Method for preparing colored plastic particles, comprising the steps of:
    mixing plastic granulate particles with coloring agent composition particles such that coloring agent composition is rubbed onto the surface of the plastic granulate particles until the surface of the plastic granulate particles is saturated with the coloring agent composition;
    wherein the coloring agency composition particles are obtained by mixing coloring agent particles and a molten carrier, which is solid at ambient temperature, followed by dispersion of the mixture to form substantially spherical particles prior to solidification of the mixture; and
    while mixing the plastic granulate particles with the coloring agent composition particles and while rubbing the coloring agent composition onto the surface of the plastic granulate particles, maintaining the plastic granulate particles and the coloring agent composition particles at a temperature which is less than the melting point of the carrier.

2. Method according to claim 1, in which up to 5% of colouring agent composition, relative to the amount by weight of plastic granules to be coloured, is mixed.

3. Method according to claim 1, in which up to 5% of colouring agent composition, relative to the amount by weight of plastic granules to be colored, is mixed.

4. Method according to claim 3 in which the carrier has a melting point below 150° C., 0.5–2% of colouring agent composition, relative to the amount by weight of plastic granules to be coloured, is mixed and the ratio of largest dimensions of the plastic granules and colouring agent composition particles is 3:1 to 20:1.

5. Method according to claim 4 in which the carrier has a melting point of 40° to 145° C.

6. Method according to claim 5 in which the carrier has a melting point of 50° to 100°C. and the ratio of largest dimensions is 10:1.

7. Method according to claim 1 in which the carrier has a melting point below 150° C.

8. Method according to claim 7 in which the carrier has a melting point of 40° to 145° C. and 0.5–2% of colouring agent composition, relative to the amount by weight of plastic granules to be coloured, is mixed.

9. Method according to claim 8 in which the carrier has a melting point of 50°–100°C. and the ratio of the largest dimensions of plastic granulate particles and colouring agent composition particles is 10:1.

10. Method according to claim 2 in which 0.5–2% of colouring agent composition, relative to the amount by weight of plastic granules to be coloured, is mixed.

11. Method according to claim 1 in which the ratio of the largest dimensions of the plastic granulate particles and the colouring agent particles is 3:1 to 20:1.

12. Method according to claim 11 in which the ratio of the largest dimensions of the plastic granulate particles and the colouring agent particles is 10:1.

* * * * *